(12) United States Patent
Hedin Dahlstrom et al.

(10) Patent No.: US 11,027,250 B2
(45) Date of Patent: Jun. 8, 2021

(54) PACKED BED EMULSIFICATION

(71) Applicant: Cytiva BioProcess R&D AB, Uppsala (SE)

(72) Inventors: Jimmy Hedin Dahlstrom, Uppsala (SE); Jonas Bengtsson, Uppsala (SE); Per Erik Emilsson, Uppsala (SE); Maranda Fordham, Uppsala (SE); Eva Holmgren, Uppsala (SE); Ronnie Palmgren, Uppsala (SE); Fernando Polanco, Uppsala (SE)

(73) Assignee: Cytiva BioProcess R&D AB, Uppsala (SE)

(*) Notice: Subject to any disclaimer, the term of this patent is extended or adjusted under 35 U.S.C. 154(b) by 0 days.

(21) Appl. No.: 16/328,129

(22) PCT Filed: Sep. 4, 2017

(86) PCT No.: PCT/EP2017/072070
§ 371 (c)(1),
(2) Date: Feb. 25, 2019

(87) PCT Pub. No.: WO2018/046430
PCT Pub. Date: Mar. 15, 2018

(65) Prior Publication Data
US 2019/0184358 A1      Jun. 20, 2019

(30) Foreign Application Priority Data

Sep. 6, 2016   (GB) .................................... 1615066

(51) Int. Cl.
*B01J 2/06*      (2006.01)
*B01F 3/08*      (2006.01)
*B01F 5/06*      (2006.01)

(52) U.S. Cl.
CPC ............... *B01J 2/06* (2013.01); *B01F 3/0811* (2013.01); *B01F 5/0696* (2013.01); *B01F 2003/0834* (2013.01); *B01F 2003/0842* (2013.01)

(58) Field of Classification Search
CPC .......... B01F 3/0811; B01J 2/06; B01D 15/34
USPC .............................................. 210/198.2, 660
See application file for complete search history.

(56) References Cited

U.S. PATENT DOCUMENTS

| | | | |
|---|---|---|---|
| 2006/0102553 A1 | 5/2006 | Danner et al. | |
| 2006/0113239 A1* | 6/2006 | Okubo | B01D 17/045 210/348 |
| 2007/0190154 A1* | 8/2007 | Zeigerson | A61K 9/1635 424/489 |

(Continued)

FOREIGN PATENT DOCUMENTS

| | | |
|---|---|---|
| EP | 0022442 A1 | 1/1981 |
| EP | 2002882 A1 | 12/2008 |
| WO | 2005/003180 A2 | 1/2005 |

OTHER PUBLICATIONS

PCT International Search Report and Written Opinion for PCT Application No. PCT/EP2017/072070 dated Nov. 12, 2017 (8 pages).

(Continued)

*Primary Examiner* — Claire A Norris
(74) *Attorney, Agent, or Firm* — Eversheds Sutherland (US) LLP (57) ABSTRACT

A system and method for producing fine droplets of polysaccharide from a premixed water-in-oil emulsion uses a packed bed (5) comprising hydrophilic beads (7).

25 Claims, 6 Drawing Sheets

(56) References Cited

U.S. PATENT DOCUMENTS

2007/0207211 A1* 9/2007 Zeigerson ............ A61K 9/1647
424/489
2010/0084328 A1* 4/2010 Ma ........................ B01J 20/285
210/198.2

OTHER PUBLICATIONS

GB Search Report for GB Application No. 1615066.6 dated Mar. 13, 2017 (4 pages).
Lambich et al., "Emulsification Using Microporous Systems," Journal of Membrane Science, 2005, pp. 76-84.
Van Der Zwan et al., "Premix Membrane Emulsification by Using a Packed Layer of Glass Beads," AIChE Journal, 2008, 54(8):2190-2197.

* cited by examiner

PACKED BED EMULSIFICATION

CROSS REFERENCE TO RELATED APPLICATIONS

This application claims the priority benefit of PCT/EP2017/072070 filed on Sep. 4, 2017 which claims priority benefit of Great Britain Application No. 1615066.6, filed Sep. 6, 2016. The entire contents of which are hereby incorporated by reference herein.

TECHNICAL FIELD

The present invention relates to systems and methods for the preparation of small droplets, for example aqueous agarose droplets, from a water-in-oil emulsion.

BACKGROUND OF THE INVENTION

The production of small polysaccharide beads, for example agarose beads, by using membrane emulsification from water-in-oil (W/O) phase is known from WO2008/133571. This patent application describes a method of preparing agarose beads using a glass hydrophobic membrane with a uniform pore diameter. A course emulsion of an aqueous agarose solution continuous phase mixed with a hot oil phase is forced through the membrane to obtain an emulsion with uniform-sized droplets. The membrane can be fouled by the emulsion which leads to blockage in the pores.

The article "Pre-mix membrane emulsification by using a packed layer of glass beads" by E. A. van der Zwan et al published in the American Institute of Chemical Engineers Journal August 2008, Volume 54, No. 8, pages 2190 to 2197, describes the use of a packed bed of hydrophilic glass beads to emulsify a premix consisting of an oil in water (O/W) phase. An advantage of a packed bed over a membrane is that the packed bed can be easily cleaned and reused by disintegrating the bed to release the contamination and then repacking the bed.

The article "Emulsification using microporous systems" by U. Lambich and H. Schubert in the Journal of Membrane Science 257 (2005) pages 76-84, which examines emulsification using membranes, it is taught in section 2.1, second paragraph that the wetting properties of the membranes are of great importance to the success of the emulsification process and that the membrane has to be wettable by the continuous phase and the importance of the correct membrane wettability is mentioned in the summery and outlook (section 7).

This is also shown in the above examples of the prior art where the surface properties of the membrane or beads were chosen so that they could be wetted by the continuous phase of the premixed emulsion being passed through it. Hence, for W/O emulsions the membranes or beads were hydrophobic and for oil-in-water (O/W) emulsions the membrane or beads were hydrophilic. It was understood in the art that in the event the membrane or beads could not be wetted by the continuous phase then complete or partial phase inversion might occur, leading in the worst case to the wrong type of emulsion (for example, in the case of agarose, the formation of an oil-in-water emulsion which forms an agarose "cake" rather than discrete beads upon gelation) or to polydispersity (i.e. a large range of droplet sizes) and/or an aggregation of droplets.

BRIEF DESCRIPTION OF THE INVENTION

The present invention relates to methods and devices for producing uniform sized beads from a water-in-oil emulsion using a packed bed of beads. Contrary to previous teachings the surface property of the bed particles is not hydrophobic and thus conducive to wetting of the particles by the continuous phase of the water-in-oil emulsion but instead the beads are hydrophilic.

DETAILED DESCRIPTION OF THE INVENTION

Figure 1:
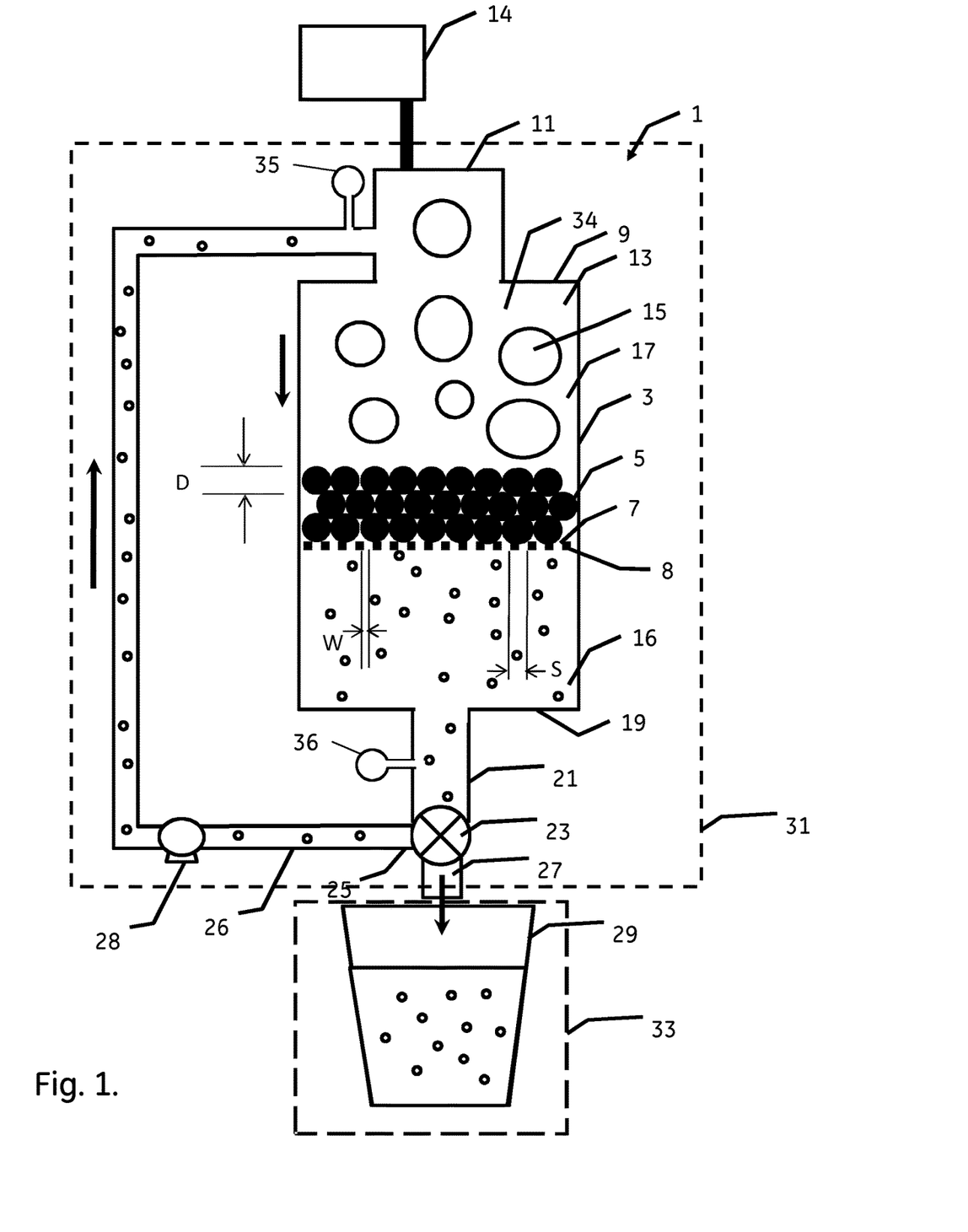
FIG. 1 shows schematically a system for the production of droplets from a water-in-oil premixed emulsion in accordance with a first embodiment of the present invention.

FIG. 1 shows schematically an emulsification system 1 for the production of droplets of a water-soluble substance from a water-in-oil premixed emulsion in accordance with a first embodiment of the present invention. The water-soluble substance preferably is a polysaccharide such as agarose, agar, agarose derivatives such as e.g. allyl agarose or hydroxyethyl agarose, which are useful in the preparation of high rigidity cross-linked agarose beads, or carrageenan, gellan or starch or the like. In particular, the polysaccharide solution may comprise native or derivatized agar or agarose. In these cases, the agar or agarose concentration in the polysaccharide solution may suitably be 2-15 wt. %, such as 2-10 wt. %. The system 1 comprises an elongated chamber 3 (shown in cross-section) which has a bed 5 extending along the cross section of the chamber 3 where the bed is formed of packed hydrophilic beads of substantially uniform diameter D. The bed extends over the cross-section of the chamber so that any material flowing from one end of the chamber to the other must pass through the bed. The bed height of the packed bed can suitably be 10-150 mm, such as 10-100 mm. The bed is formed on a bed support 7 in the form of a grid or mesh or perforated plate or the like comprising a plurality of holes 8 (which may be perforations or slots in a plate or membrane, or spaces between wires of a mesh or the like) each of which have at least one dimension W such as width, diameter or length which is smaller than the diameter of the beads in order to prevent the beads from passing through the holes. The dimensions of the holes should not be too small as the back pressure will be too high and the support may start to act like a membrane and diminish the droplet size. Preferably the dimension W is equal to or greater than 0.3 D and less than or equal to 0.9 D. Furthermore, the center-to-center spacing S of the holes should not correspond to the diameter D of the beads, as this might lead to beads settling into the holes and blocking them.

Preferably the beads used in the bed are sufficiently hydrophilic such that water will flow vertically through the bed solely under the influence of gravity. Examples of preferred beads are hydrophilic glass, ceramic, silica, polymer and metal beads, and beads with a hydrophilic surface coating, e.g. a layer of a polysaccharide or other hydrophilic polymer. Glass beads like borosilicate or soda-lime glass beads are easily available (e.g. from Potters Industries LLC or Cospheric LLC) and if a high degree of hydrophilicity is desired, they can advantageously be cleaned with e.g. Piranha solution (a sulfuric acid—hydrogen peroxide mixture prepared from 3-7 parts concentrated sulfuric acid and 1 part 30% hydrogen peroxide). Preferably at least 80 wt %, more preferably at least 90 wt %, and even more preferably at least 95 wt % of the beads have diameters within the range of the weight average mean diameter plus or minus 10% of the weight average mean diameter. This can easily be determined using conventional sieving analysis. A narrow size distribution ensures that the interstitial channels have uniform dimensions and leads to the formation of droplets with narrow size distributions. The weight average mean diameter can suitably be within the range of 50-2000 μm, such as 100-2000, 100-1000, 100-500 μm or 150-400 μm.

The chamber has a first end wall, in this example the upper end wall 9, which comprises an inlet port 11 through which a premixed water-in-oil emulsion 13 from a source of premixed emulsion 14 can be introduced into the chamber before the packed bed. The direction of flow through the system is shown by arrows. This region of the chamber before the packed bed in the direction of flow is called the inlet side 34 of the chamber. A water-in-oil premixed emulsion comprises coarse droplets 15 of an aqueous solution of a gellable substance such as a polysaccharide, for example a thermally gelling polysaccharide like agarose or agar, agarose derivatives such as e.g. allyl agarose or hydroxyethyl agarose, or carrageenan, gellan or starch or the like in a continuous phase 17 of oil, e.g. a hydrocarbon like toluene, paraffin oil etc. A premixed water-in-oil emulsion preferably also comprises a water-in-oil emulsifier, which can e.g. comprise an oil-soluble surfactant like a partial fatty acid ester of a polyol (e.g. a diglyceride, a sorbitan ester or a polyglycerol fatty ester such as polyglycerol-3 diisostearate) and/or an oil-soluble polymer, e.g. a cellulose derivative such as ethyl cellulose or cellulose acetate butyrate. The water-in-oil emulsifier may suitably have a molecular weight of 2 kDa or lower, such as 1 kDa or lower. The oil-soluble polymer can suitably have a weight average molecular weight of above 5 kDa, such as above 10 kDa or 20-200 kDa. It can be advantageous if all or a portion of the water-in-oil emulsifier is added to the premixed emulsion before passage through said chamber(s), as this may allow the production of a premixed emulsion with a lower fraction of undersize droplets, while still providing adequate stabilization for the packed bed emulsification process. The premixed emulsion may be prepared by conventional means, e.g. in an agitated vessel or in a rotor-stator homogenizer. In use the premixed emulsion passes through the interstitial channels between the beads of the packed bed which causes the coarse droplets of aqueous solution to break up into smaller, fine droplets. The region of the chamber after the packed bed in the direction of flow is called the outlet side 16 of the chamber. The chamber has a second end wall at the opposite end of the chamber, in this example lower end wall 19, comprising an outlet port 21 through which the contents of the chamber can be exhausted. Outlet port 21 can lead to a valve 23 comprising at least two outlets 25, 27 one of which is a recirculation outlet 25 and the other is an exhaust outlet 27. Recirculation outlet 25 is in fluid connection to the inlet side of the packed bed via a recirculation channel 26. This arrangement permits the recirculation to the inlet side of the chamber of fluid and fine droplets leaving the outlet side of the chamber. This flow may be achieved by flow producing means such as any suitably placed conventional pump 28, e.g. a membrane pump, by gravity or by pressurization with a gas pressure. This channel may be used to transport fine droplets that have passed through the packed bed back to the inlet of the chamber where they will be able to pass through the packed bed again. This recirculation of fine droplets through the packed bed helps to reduce the spread in the size of the droplets. The pressure drop over the packed bed may e.g. be measured as the difference between the pressure readings of inlet pressure sensor 35 and outlet pressure sensor 36. If the pressure at the outlet port 21 is equal to atmospheric pressure, the pressure drop can be measured using sensor 35 only. Outlet 27 leads to a collection receptacle 29 or to a further processing stage (not shown). When valve 23 connects the outlet port 21 to exhaust outlet 27 the contents of the system can be voided to the receptacle 29 or sent to a further processing stage. The system can be maintained at an elevated temperature appropriate for the formation of thermally gellable polysaccharide droplets (depending on the melting and gelation points of the polysaccharide), for example a temperature which is preferably greater or equal to 55° C. and less than or equal to 90° C., or more preferably greater or equal to 60° C. and less than or equal to 80° C., by heating means such as a heating jacket 31 (shown by dotted lines) which maintains at least the chamber, and preferably the also valve, pump and/or recirculation channel, at the appropriate temperature. Preferably the fine droplets collected in the receptacle can subsequently be treated to form beads, for example by cooling the receptacle below the gelation temperature by cooling means such as a cooling jacket 33 (shown schematically by a dashed line). The beads may further be subjected to further reactions, for example cross-linking and/or derivatization reactions, in subsequent operations. Examples of suitable cross-linking methods are provided in e.g. U.S. Pat. Nos. 3,507,851, 4,973,683, 6,602,990 and 7,396,467, which are hereby incorporated by reference in their entireties. Examples of suitable derivatization methods are provided in e.g. U.S. Pat. Nos. 6,399,750, 7,867,784, 7,067,059, 8,858, 800 and 9,573,973, which are hereby incorporated by reference in their entireties. Cross-linked and/or derivatized beads may be packed into columns and used for chromatographic separations of e.g. biomolecules such as proteins, nucleic acids, protein conjugates, viruses, virus-like particles, polysaccharides etc., e.g. for the purpose of manufacturing biopharmaceuticals.

Figure 2:
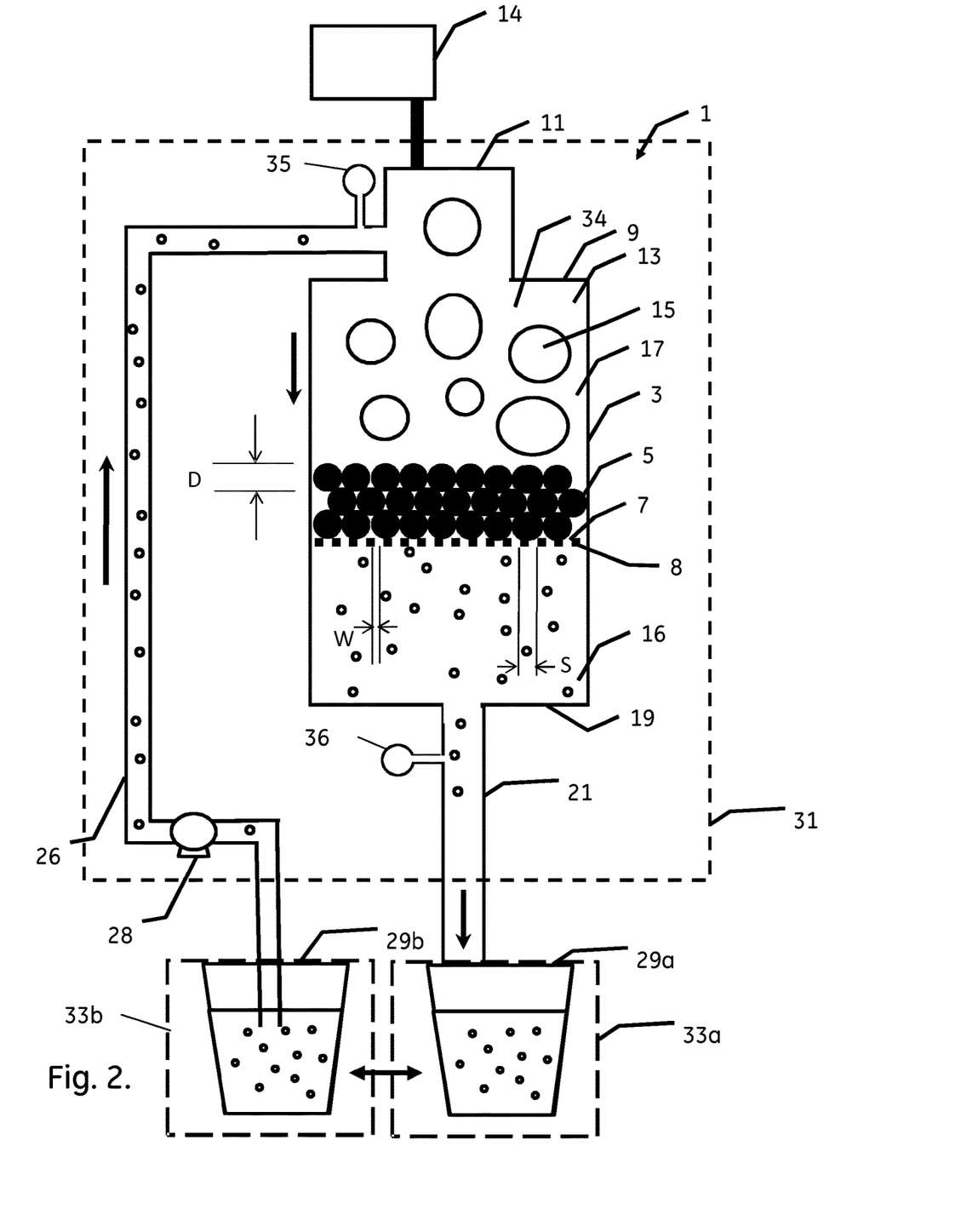
FIG. 2 shows a variant system of the invention.

In a manufacturing process, it is possible to use the emulsification system 1 illustrated in FIG. 1, with or without the recirculation via channel 26. FIG. 2 shows a variant of system 1 for a batch recirculation process. Here, the outflow from chamber 3 is directed via outlet 21 to receptacle 29a, which during the process is kept heated by jacket 33a. When the whole batch has passed through the chamber, receptacle 29a is reconfigured, by moving or by switching one or more valves (not shown), to the position of receptacle 29b, while still being heated by jacket 33b. The emulsion from what is now receptacle 29b is then pumped via recirculation pump 28 through the chamber again and the outflow is directed to another receptacle in position 29a. This can be repeated for as many recirculation cycles as desired, until the emulsion is finally collected in receptacle 29a and cooled to solidify the beads as discussed above. The shifting of the receptacles can be made manually or automatically, depending on the operation mode.

Figure 3:
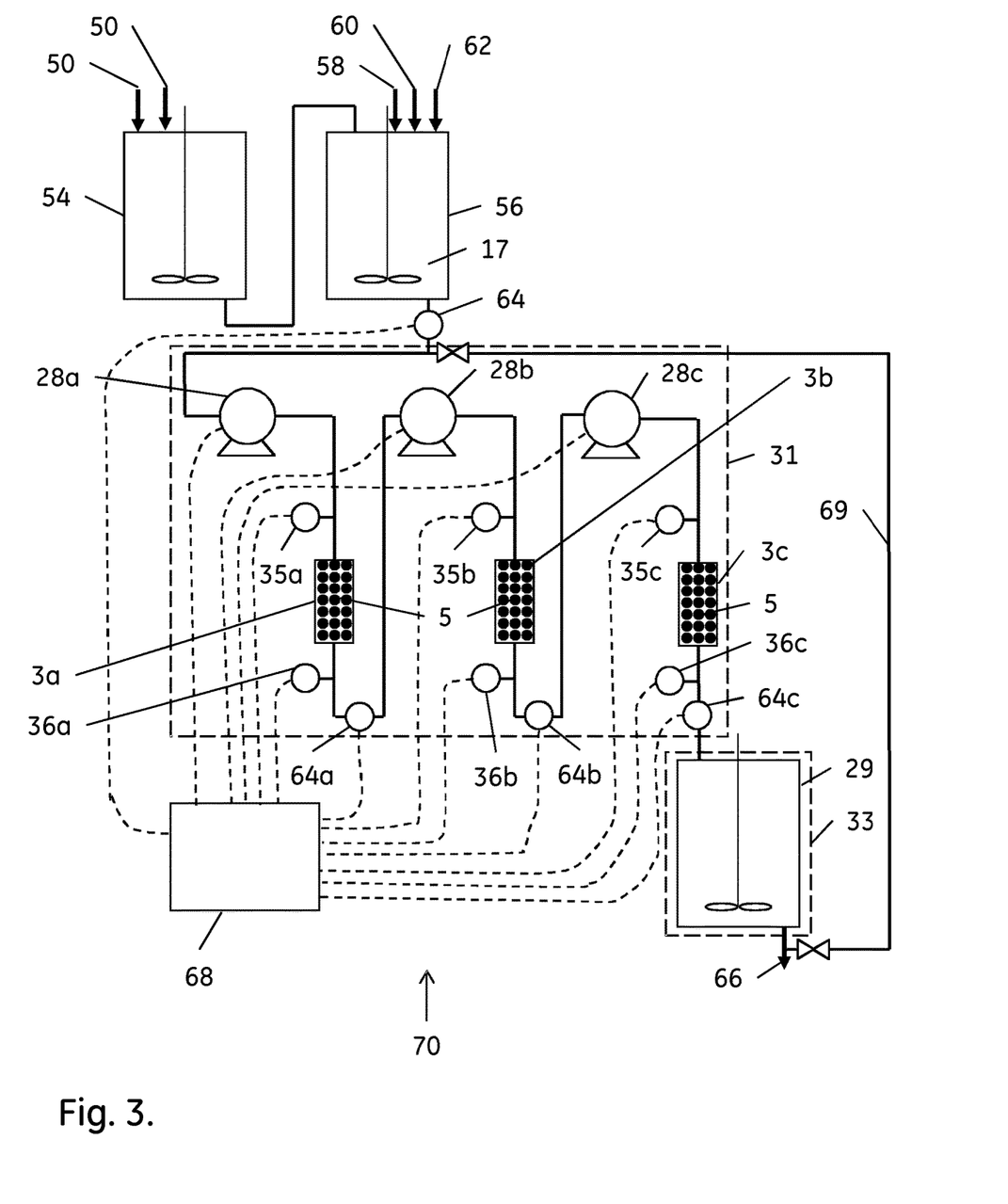
FIG. 3 shows another variant of the system of the invention.

It is however also possible to use a process allowing multiple packed bed passages without any recirculation loop. FIG. 3 illustrates an emulsification system 70 suitable for such a process. The system comprises a plurality of chambers 3a,3b,3c with packed beds 5, as disclosed above. It further comprises at least one pump 28a,28b,28c, as disclosed above, but it can suitably comprise a plurality of pumps, such as one pump 28 for each chamber 3a,3b,3c. During use, a pre-emulsion is prepared, e.g. by dissolving polysaccharide 50 (e.g. agarose or an agarose derivative) in water 52 at elevated temperature in dissolution vessel 54 and preparing the pre-emulsion, e.g. in pre-emulsification vessel 56, where a heated oil phase 17 is present, comprising an oil 58 as discussed above and preferably an oil-soluble polymer 62 as discussed above and a water-in-oil emulsifier 60 as discussed above. The pre-emulsion may be prepared by agitation in the vessel, but also other methods are feasible, e.g. sonication, rotor-stator homogenizers etc. The pre-emulsion is then conveyed, optionally via a droplet size sensor 64, to the first chamber 3a and further to the second chamber 3b, optionally using a second pump 28b, and yet further to the third chamber 3c, optionally using a third pump 28c. The emulsion can be conveyed from the third chamber to a collection receptacle 29 as discussed above, for cooling with cooling jacket 33, or other temperature control equipment, to convert the emulsion droplets to solid beads. The beads may then be conveyed from bead outlet 66 for further process steps, such as cross-linking and/or derivatization with ligands suitable for binding target biomolecules. The pressure drops over the chambers 3a,3b,3c can be measured with inlet pressure sensors 35a,35b,35c and outlet pressure sensors 36a,36b,36c as discussed above. Optionally, the droplet sizes after each chamber may be measured with droplet size sensors 64a,64b,64c. Suitably, the chambers, pumps, sensors and the tubing connecting them are enclosed in a heated and temperature-controlled compartment or jacket 31. A control unit 68, e.g. a computer, is suitably connected to the pumps, pressure sensors and droplet size sensors for controlling the process. The system is here shown with three chambers but it can equally well be modified to have a lower number of chambers, (e.g. one or two chambers) or a higher number of chambers (e.g. four, five or six chambers). An optional recirculation channel 69 allows the recycling of the emulsion through the chambers if desired.

A method for producing fine droplets of polysaccharide material from a water-in-oil premixed emulsion in accordance with the present invention comprises the following steps:

providing at least one chamber with a packed bed of hydrophilic beads, as discussed above;

passing a water-in-oil premixed emulsion comprising coarse droplets of aqueous polysaccharide solution in an oil (for example toluene) through the packed bed to form fine droplets, optionally recirculating the fine droplets through the packed bed(s).

The premixed emulsion can be prepared as discussed above and may have a d50 median diameter of e.g. 100-500 µm, such as 150-300 µm. The final emulsion produced may have a d50 median diameter of e.g. 5-100 µm, such as 5-30 µm. The pressure drop over the chamber, such as over each chamber may e.g. be 0.1-3 bar, such as 0.1-2 bar, 0.1-0.5 bar or 0.5-2 bar. Working in the 0.5-2 bar range, e.g. 1-2 bar, gives more narrow size distributions, while in the 0.1-0.5 bar range the median diameter of the droplets may be controlled by the pressure.

Surprisingly it has been found that the use of such a method in which the wettability of the beads with respect to the continuous phase is the opposite of that previous used leads to good results with respect to fine droplet size dispersion.

EXAMPLE 1

FIG. 3 shows the results of passing a premixed emulsion (prepared in an agitated vessel) comprising coarse droplets of 2.4% by weight agarose aqueous solution in a continuous oil phase of toluene, Aqualon ethyl cellulose N50 (Hercules Inc., Wilmington, Del.) and Prisorine 3700 (polyglycerol-3 diisostearate, Croda UK) (also sold under the name of Cithrol PG32IS) at a temperature of 60° C. through a packed bed formed of hydrophilic borosilicate glass beads (Cospheric LLC, BSGMS-2.2 180-212 µm) at 60° C. The hydrophilic glass beads had a span in diameter which ranged from 180-212 µm, the bed diameter was 15 mm and the bed height 40 mm and the bed was supported by a plain woven stainless steel sieving cloth with 100 µm aperture size. The fine droplets obtained after one pass through a packed bed were recirculated twice using a membrane pump and the graph shows how the resulting droplet size distribution improved after each pass through the packed bed.

EXAMPLE 2

The experiments in Example 2 were performed with allylated agarose solutions of different concentrations, using different types of beads in the packed beds. The system was as shown in FIG. 2, with manual shifting of the receptacles for recirculation and with gas pressure from a nitrogen gas cylinder used to push the emulsions through the packed bed.

Agarose Solutions

To make agarose solutions of 2.4, 3.5 and 6.0 wt. % concentrations, 24, 35 and 60 g agarose respectively were added to 1000 g of water and dissolved under stirring at 92° C. The solutions were kept under stirring at 92° C. for 75-120 min and then cooled to 69° C. before allylation. 10 ml 50% NaOH was added to each solution at a rate of 15 ml/min. 20 ml allyl glycidyl ether (AGE) was then added at a rate of 15 ml/min. The reactions were allowed to proceed for approx. 3 h and the reaction mixtures were neutralized with acetic acid (pH 7-8).

Oil Phase 15 g Aqualon ethyl cellulose N50 and 4.8 g Prisorine 3700 were dissolved in 1.5 l toluene. The solution was heated to 70° C. and kept under stirring at this temperature for 2 h before preparation of the pre-emulsion.

Pre-Emulsion

At 180 ppm stirring rate the allyl agarose solution was slowly added to the oil phase over 3.5-8 min after 5 min at 180 rpm, a small sample was removed and the particle size measured in a Malvern Mastersizer 2000. If the median diameter of the agarose droplets was within the 100-200 µm interval, agitation was continued at 180 rpm until start of the packed bed emulsification, otherwise the rpm was increased in steps until the 100-200 µm droplet size was reached.

Packed Bed

The different bead types used (both glass and steel beads from Cospheric LLC) in the packed beds are listed in Table 1.

TABLE 1

Bead types

| Bead designation | Material | Size range (μm) | Approx. interstitial pore diameter (μm) |
|---|---|---|---|
| BG180-212 | Borosilicate glass | 180-212 | 90 |
| BG300-355 | Borosilicate glass | 300-355 | 150 |
| BG710-850 | Borosilicate glass | 710-850 | 350 |
| BG710-850APTES | Borosilicate glass treated with APTES | 710-850 | 350 |
| SS190-220 | Stainless steel | 190-220 | 90 |
| SS310-360 | Stainless steel | 310-360 | 150 |
| SS710-880 | Stainless steel | 710-880 | 350 |

The treatment of borosilicate beads with aminopropyltriethoxysilane (APTES) was performed by activating the beads in 1M NaOH at 60° C. for 1 h, followed by rinsing in distilled water, 4 h drying at 70° C., soaking in an ethanolic APTES solution for 1 h, rinsing with ethanol and overnight drying at 70° C.

The bed diameter was 15 mm and the bed height 70 mm and the bed was supported by a plain woven stainless steel sieving cloth with 100 μm aperture size.

Packed Bed Emulsification

The system was thermostated to 75° C. and was flushed with heated toluene before start of the emulsification. The pre-emulsion was then passed through the system with the packed bed four times and the droplet size distribution of the emulsion produced was measured with a Malvern Mastersizer 2000 light diffraction instrument after each cycle. The droplet diameter was expressed as the volume-weighted median diameter d50 and the width of the distribution as the span (d90-d10)/d50, where d90 is the diameter at which 90% of the particle volume consists of smaller particles than d90 and d10 the diameter at which 10% of the particle volume consists of smaller particles than d10. The pressure was measured with a pressure gauge at the bed inlet (measuring the pressure over atmospheric pressure) and the pressure drop was taken as the gauge reading (the outlet was open to atmospheric pressure).

Results

TABLE 2

Results from Example 2
(droplet size data after four passages through the packed bed).

| Agarose conc. (wt %) | Beads | Pressure drop (bar) | d50 (μm) | Span |
|---|---|---|---|---|
| 2.4 | BG180-212 | 1.63 | 7.96 | 0.89 |
| 3.5 | BG180-212 | 1.13 | 16.0 | 0.78 |
| 6.0 | BG180-212 | 1.14 | 21.6 | 0.84 |
| 2.4 | BG300-355 | 1.13 | 11.2 | 1.00 |
| 3.5 | BG300-355 | 1.57 | 12.7 | 0.81 |
| 6.0 | BG300-355 | 1.10 | 21.8 | 1.16 |
| 2.4 | BG710-850 | 1.11 | 12.2 | 1.06 |
| 3.5 | BG710-850 | 1.12 | 14.2 | 0.83 |
| 6.0 | BG710-850 | 1.61 | 21.5 | 1.19 |
| 2.4 | SS190-220 | 1.12 | 11.2 | 1.03 |
| 3.5 | SS190-220 | 1.13 | 12.0 | 0.81 |
| 6.0 | SS190-220 | 1.62 | 16.8 | 0.83 |
| 2.4 | SS310-360 | 1.12 | 11.8 | 0.80 |
| 3.5 | SS310-360 | 1.57 | 12.7 | 0.81 |
| 6.0 | SS310-360 | 1.10 | 20.2 | 1.22 |
| 6.0 | SS310-360 | 1.59 | 18.4 | 1.16 |
| 2.4 | SS710-880 | 1.60 | 10.8 | 1.11 |
| 3.5 | SS710-880 | 1.11 | 13.9 | 0.90 |
| 3.5 | SS710-880 | 1.61 | 11.4 | 0.93 |
| 6.0 | SS710-880 | 1.13 | 29.3 | 1.23 |
| 6.0 | BG710-850 APTES | 1.60 | 20.9 | 1.19 |

The major effect in these experiments was from the agarose concentration, with higher concentrations producing larger droplets, possibly due to the higher viscosities of the solutions. Glass beads, stainless steel beads and glass beads treated with the hydrophilic APTES silane all performed well.

EXAMPLE 3

These experiments were all carried out with 6.0% allyl agarose solutions, prepared as in Example 2. Also the oil phase and pre-emulsion were prepared as in Example 2. Variations were made in the pressure drop, the bead material, the bead size and the bed height.

Results

TABLE 3 results from Example 3.

| Beads | Bed height (mm) | Pressure drop (bar) | Cycle No. | d50 (μm) | Span |
|---|---|---|---|---|---|
| BG710-850 | 70 | 0.10 | 1 | 87.2 | 2.37 |
| BG710-850 | 70 | 0.10 | 2 | 70.1 | 1.82 |
| BG710-850 | 70 | 0.10 | 3 | 60.8 | 1.78 |
| BG710-850 | 70 | 0.10 | 4 | 61.6 | 1.74 |
| BG710-850 | 70 | 0.10 | 5 | 61.8 | 1.70 |
| BG710-850 | 70 | 0.20 | 1 | 57.4 | 2.38 |
| BG710-850 | 70 | 0.20 | 2 | 52.2 | 2.10 |
| BG710-850 | 70 | 0.20 | 3 | 48.6 | 1.92 |
| BG710-850 | 70 | 0.20 | 4 | 46.2 | 1.99 |
| BG710-850 | 70 | 0.20 | 5 | 46.8 | 1.85 |
| BG710-850 | 70 | 0.30 | 1 | 42.9 | 2.11 |
| BG710-850 | 70 | 0.30 | 2 | 44.6 | 2.02 |
| BG710-850 | 70 | 0.30 | 3 | 41.6 | 1.75 |
| BG710-850 | 70 | 0.30 | 4 | 37.6 | 1.77 |
| BG710-850 | 70 | 0.30 | 5 | 46.4 | 1.77 |
| BG710-850 | 70 | 0.40 | 1 | 42.6 | 2.16 |
| BG710-850 | 70 | 0.40 | 2 | 41.2 | 1.94 |
| BG710-850 | 70 | 0.40 | 3 | 40.8 | 1.82 |
| BG710-850 | 70 | 0.40 | 4 | 36.1 | 1.86 |
| BG710-850 | 70 | 0.40 | 5 | 34.6 | 1.82 |
| BG710-850 | 70 | 0.50 | 1 | 42.7 | 2.35 |
| BG710-850 | 70 | 0.50 | 2 | 37.8 | 2.04 |
| BG710-850 | 70 | 0.50 | 3 | 35.1 | 1.96 |
| BG710-850 | 70 | 0.50 | 4 | 33.4 | 1.89 |
| BG710-850 | 70 | 0.50 | 5 | 31.3 | 1.83 |
| BG710-850 | 70 | 0.40 | 5 | 34.6 | 1.82 |
| SS710-880 | 70 | 0.40 | 5 | 33.0 | 1.85 |
| BG300-355 | 70 | 0.40 | 5 | 32.2 | 1.44 |
| BG710-850 | 17.5 | 0.40 | 1 | 77.2 | 2.24 |
| BG710-850 | 17.5 | 0.40 | 2 | 58.2 | 1.90 |
| BG710-850 | 17.5 | 0.40 | 3 | 50.5 | 1.84 |
| BG710-850 | 17.5 | 0.40 | 4 | 45.7 | 1.81 |
| BG710-850 | 17.5 | 0.40 | 5 | 44.3 | 1.67 |
| BG710-850 | 17.5 | 0.40 | 6 | 38.7 | 1.72 |
| BG710-850 | 17.5 | 0.40 | 7 | 40.3 | 1.63 |
| BG710-850 | 17.5 | 0.40 | 8 | 36.8 | 1.63 |

Figure 4:
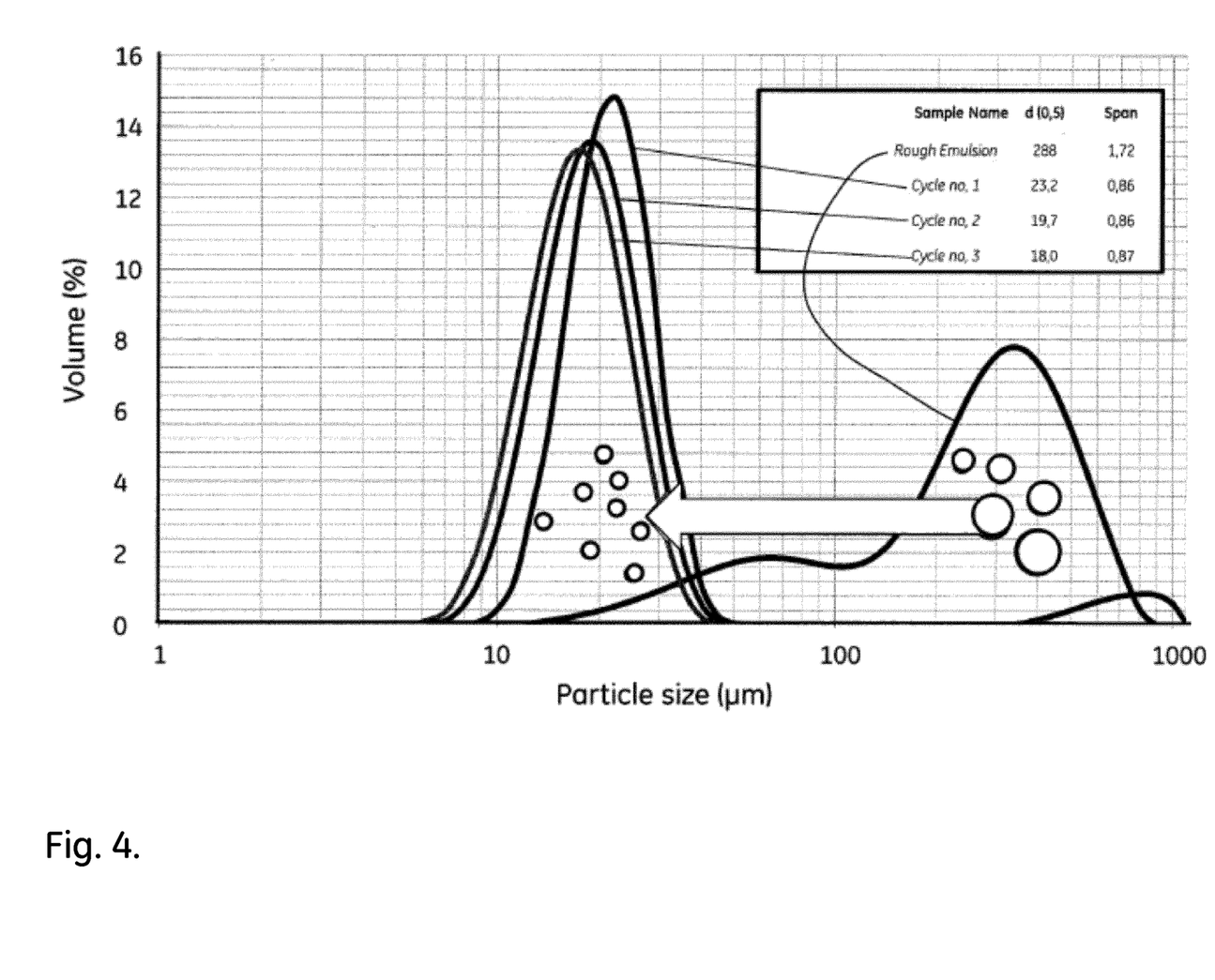
FIG. 4 shows experimental results from Example 1, achieved when passing a water-in-oil premixed agarose emulsion through a packed bed formed of hydrophilic glass particles. d(0,5) is the volume-weighted median diameter (d50).
Figure 5:
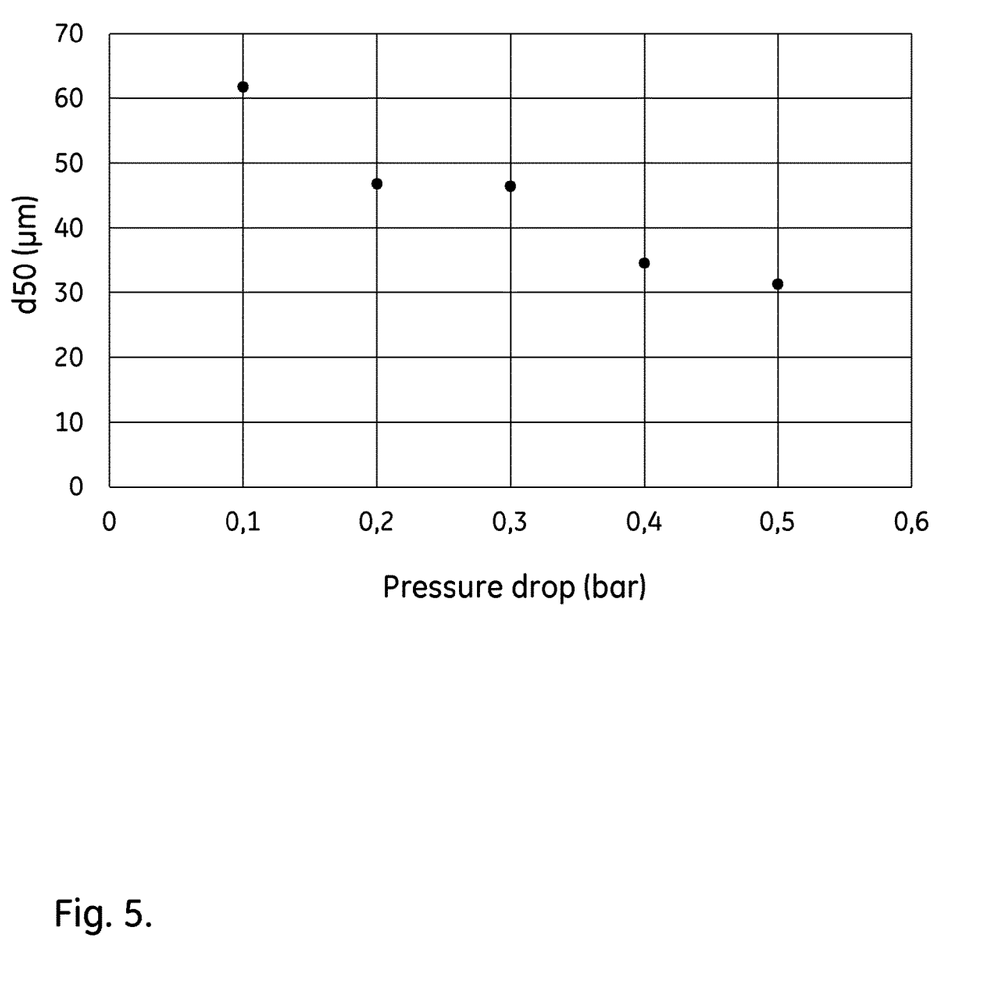
FIG. 5 shows results from Example 3, with the volume-weighted median diameter (d50) after five passages through the 70 mm packed bed as a function of the pressure drop over the bed.
Figure 6:
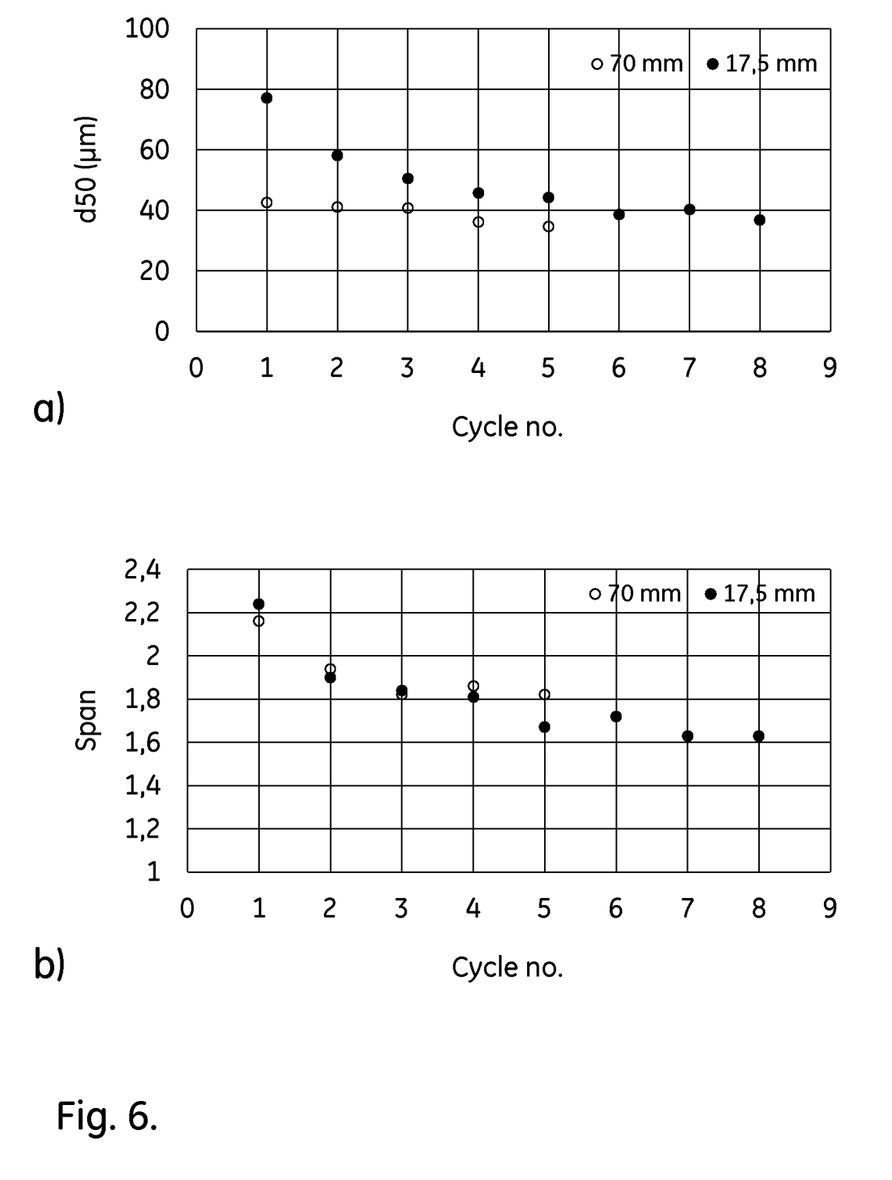
FIG. 6 shows results from Example 3, with the volume-weighted median diameter (d50) and the span as a function of the number of passages through packed beds with bed heights 70 and 17.5 mm at 0.40 bar pressure drop. a) d50 and b) span.

A major effect in these experiments is from the pressure drop, as can be seen in FIG. 4 where d50 after five passages through the 70 mm bed is plotted against the pressure drop. The pressure drop can thus be used as a parameter to control the process. Also the bed height was of importance, as shown by FIG. 5 for 0.40 bar pressure drop, where a larger number of cycles is needed with the 17.5 mm bed to reach the same median diameter as with the 70 mm bed. The effects of the bead material and the bead size were minor in comparison.

EXAMPLE 4

If the pre-emulsion contains a significant fraction of droplets smaller than the d50 achieved after packed bed emulsification, these smaller droplets will contribute to a higher span of the final distribution. Some experiments were made with the pre-emulsification procedure and it was found that preparing a pre-emulsion with no water-in-oil emulsifier (Prisorine) in the oil phase gave significantly lower numbers of smaller droplets. However, these emulsions had issues with flocculation during the packed bed emulsification. This may be offset by using low or zero concentrations of the water-in-oil emulsifier during pre-emulsion preparation and adding water-in-oil emulsifier to the pre-emulsion before packed bed emulsification.

The scope of the present disclosure is defined by the following claims rather than by the detailed description of the embodiment. It shall be understood that all modifications and embodiments conceived from the meaning and scope of the claims and their equivalents are included in the scope of the present disclosure.

The invention claimed is:

1. A system for the production of polysaccharide droplets from a water-in-oil emulsion comprising, at least one chamber comprising an inlet side connectable to a source of water-in-oil emulsion containing droplets of an aqueous solution of a polysaccharide in an oil-based continuous phase, an outlet side, a packed bed of beads between the inlet side and the outlet side, and flow-producing means for providing a flow of water-in-oil emulsion through the packed bed to an outlet port, wherein the beads are hydrophilic beads, and a bed height of the packed bed is 10-70 mm.

2. The system of claim 1, wherein the hydrophilic beads are made of glass.

3. The system of claim 2, wherein the hydrophilic beads are made of glass with a hydrophilic surface coating.

4. The system of claim 1, wherein the hydrophilic beads are made of stainless steel.

5. The system of claim 1, wherein the hydrophilic beads have a weight average diameter of 0.1-2 mm.

6. The system of claim 1, wherein the diameter of each bead is D and the packed bed is supported on a bed support comprising a plurality of through holes which each have at least one dimension W which is smaller than the diameter D of the beads in order to prevent the beads from passing through the holes.

7. The system of claim 6, wherein said dimension W of the through holes is equal to or greater than 0.3 times the diameter D of the beads and less than or equal to 0.9 times the diameter D of the beads.

8. The system of claim 1, which is provided with a channel for the recirculation of droplets from said outlet port to the inlet of the chamber.

9. The system of claim 1, wherein at least the chamber is provided with heating means.

10. The system of claim 1, comprising a plurality of serially coupled chambers with packed beds, optionally with flow-producing means between the chambers.

11. A method for producing fine droplets of polysaccharide material from a water-in-oil premixed emulsion characterized in that it comprises the following steps:
providing a chamber with a packed bed of hydrophilic beads, wherein a bed height of the packed bed is 10-70 mm;
passing a water-in-oil premixed emulsion comprising coarse droplets of aqueous polysaccharide solution in an oil through the packed bed to form fine droplets; and,
optionally recirculating the fine droplets through the packed bed.

12. The method of claim 11, wherein the polysaccharide solution comprises native or derivatized agar or agarose.

13. The method of claim 12, wherein the agar or agarose concentration in the polysaccharide solution is 2-15 wt. %.

14. The method of claim 11, further comprising a step of heating the chamber(s) to a temperature which is greater or equal to 55° C. and less than or equal to 90° C.

15. The method of claim 11, further comprising a step of heating the chamber(s) to a temperature which is greater or equal to 60° C. and less than or equal to 80° C.

16. The method of claim 11, wherein the system comprises one or more pressure sensors capable of measuring the pressure drop over the chamber(s), and wherein the pressure drop is controlled in order to keep the size of the droplets within a predetermined interval.

17. The method of claim 11, wherein said premixed emulsion comprises an oil-soluble polymer and wherein a water-in-oil emulsifier is added to said premixed emulsion before passage through said chamber(s).

18. The method of claim 11, wherein the volume-weighted median diameter (d50) of the droplets in said premixed emulsion is 100-500 µm.

19. The method of claim 11, wherein the pressure drop over said chamber(s) is 0.1-3 bar.

20. The method of claim 19, wherein the pressure drop is 0.1-0.5 bar.

21. The method of claim 19, wherein the pressure drop is 0.5-2 bar.

22. The method of claim 11, wherein the volume-weighted median diameter (d50) of the fine droplets is 5-100 µm.

23. The method of claim 11, comprising 2-10 passages of the emulsion through the packed bed(s).

24. The method of claim 11, wherein the fine droplets produced are solidified to form solid beads by cooling.

25. The method of claim 24, wherein the solidified beads are cross-linked and/or derivatized in subsequent operations.

* * * * *